(12) United States Patent
Schiff

(10) Patent No.: US 6,449,463 B1
(45) Date of Patent: Sep. 10, 2002

(54) VARIABLE LOOP GAIN IN DOUBLE LOOP POWER CONTROL SYSTEMS

(75) Inventor: Leonard N. Schiff, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 09/183,388

(22) Filed: Oct. 29, 1998

(51) Int. Cl.[7] .................................. H04B 1/04
(52) U.S. Cl. .................. 455/69; 455/67.1; 455/522; 455/127; 455/115
(58) Field of Search ................. 455/69, 68, 67.1, 455/67.3, 522, 92, 127, 115

(56) References Cited

U.S. PATENT DOCUMENTS

| | | | |
|---|---|---|---|
| 5,574,984 A | 11/1996 | Reed et al. | 455/69 |
| 5,713,074 A | 1/1998 | Hulbert | 455/69 |
| 6,075,974 A | * 6/2000 | Saints et al. | 455/69 |

FOREIGN PATENT DOCUMENTS

| | | | |
|---|---|---|---|
| EP | 0715423 | 6/1996 | H04B/7/005 |
| EP | 0853393 | 7/1998 | H04B/7/26 |

OTHER PUBLICATIONS

Ashwin Sampath, et al.; On Setting Reverse Link Target SIR in a CDMA System; Mar. 1997; IEEE Vehicular Technology Conference, US, New York, IEEE; vol. CONF. 47; pp. 929–933.

* cited by examiner

*Primary Examiner*—Lee Nguyen
*Assistant Examiner*—Philip J. Sobutka
(74) *Attorney, Agent, or Firm*—Philip R. Wadsworth; Gregory D. Ogrod

(57) ABSTRACT

An apparatus and method for using a variable loop gain in a double-loop power control system to control the power of a forward link signal sent by a gateway to a user terminal to compensate for fading in a wireless communications system. In one embodiment the invention includes the steps of detecting fast fading in the forward link signal and informing the gateway of the fast fading; and at the gateway, reducing the loop gain of the power control loop when fast fading is indicated. In another embodiment, the invention includes the steps of, at the gateway, detecting fast fading in a reverse link signal received from the user terminal and reducing the loop gain of the power control loop when fast fading is indicated.

20 Claims, 6 Drawing Sheets

VARIABLE LOOP GAIN IN DOUBLE LOOP POWER CONTROL SYSTEMS

BACKGROUND OF THE INVENTION

I. Field of the Invention

The present invention relates to wireless communication systems. More specifically, the present invention relates to a novel and improved system and method of power control in a wireless communications system.

II. Related Art

Wireless communication networks are enjoying notable popularity in all aspects of business, industry and personal life. As such, portable, hand-held communication devices have experienced widespread growth in recent years. Portable devices such as cellular phones are now commonplace with business and personal users alike. Additionally, advanced systems, such as satellite communications systems using portable, hand held and mobile phones, are currently being deployed.

In wireless communication systems, signals are subject to fading. Fading occurs when environmental factors diminish the power of a signal during its transmission from transmitter to receiver. One measurement that quantifies fading is the signal-to-noise ratio (SNR) of the received signal as measured at the receiver. Systems have been developed to adjust the transmitted power of the signal to compensate for fading. One such system is known as "single-loop" power control.

In a single-loop power control system, the receiver monitors the SNR of the received signal and sends commands to the transmitter to adjust the transmitted power so as to maintain a specified "threshold" SNR at the receiver. Conventional single-loop power control systems generally employ two or three types of such commands. One type of command instructs the transmitter to increase the transmitted power. Another type of command instructs the transmitter to decrease the transmitted power. The amount by which the transmitted power is increased or decreased in response to such a command is referred to as the "gain" of the loop. In some systems, a third type of command is used to instruct the transmitter to maintain the transmitted power at the current level.

Single-loop power control works well in an environment with slow fading. In slow fading, there is no substantial fading during the time required for a power control command to reach the transmitter and the resulting signal-to-noise ratio to be measured at the receiver, known as the "period" of the loop. One example of a slow fading environment is one having only thermal noise as signal interference.

However, in a signal environment with medium-speed fading, single-loop power control is inadequate. In medium-speed fading, there is substantial fading during a single loop period. One example of a medium-speed fading environment is where the transmitter or receiver is moving rapidly past stationary obstructions, causing rapid changes in signal attenuation. In such a medium-speed fading environment, the threshold SNR may be insufficient to ensure signal quality. This is because the loop is too slow to respond to the rapid variations in the SNR of the received signal.

In digital communication systems, the adequacy of the threshold SNR can be quantified by the ratio of information bits received in error to the total number of bits received. This ratio is generally computed repeatedly for each frame. The ratio thus computed is known as the "frame error rate" (FER) of the signal. One type of system developed to address this problem is known as a "double-loop" power control system.

In a double-loop power control system, the single-loop power control system described above is used as the "inner" loop. The SNR threshold used by the inner loop is modified by an "outer" loop based on the FER of the received signal. For example, when the FER rises above a predetermined PER threshold, the threshold SNR is increased by a fixed, predetermined amount. This process continues until the FER falls below the FER threshold.

One consideration in double-loop power control systems is the selection of the magnitude of the fixed gain employed by the inner loop. The selection of this gain is a trade-off between two conflicting considerations. In a medium-speed fading environment, rapid loop response is required. This consideration argues for a large inner-loop gain. With a large inner-loop gain, fewer loop periods are required to change the threshold SNR by a large amount. However, in a slow fading signal environment, a large gain will result in large SNR oscillations about the threshold SNR. These oscillations waste transmitter power. Thus a fixed inner-loop gain is not suitable for applications in which the signal will experience both fast fading and slow fading.

Furthermore, fixed gain systems experience difficulty in fast fading signal environments. In fast fading, the SNR experiences several large oscillations within a single outer-loop period (that is, the time required to adjust the SNR threshold based on one or more FER measurements). Fast fading oscillations are typically on the order of hundreds of hertz. In such an environment, the response time of the inner loop is no longer important because the inner loop cannot possibly keep up with the fading. What is needed is a double-loop power control system where the inner-loop gain can be varied to suit the speed of the fading.

SUMMARY OF THE INVENTION

The present invention is an apparatus and method for adjusting the power of a signal sent by a transmitter to a receiver to compensate for fading in a wireless communications system. In one embodiment, the method includes the steps of measuring, at a first station, a signal-to-noise ratio of a signal transmitted by a second station; adjusting a transmitted signal power of the signal as a function of a loop gain, the signal-to-noise ratio, and a signal-to-noise ratio threshold; measuring, at the first station, a signal quality of the received signal; adjusting the signal-to-noise ratio threshold as a function of the signal quality and a signal quality threshold; measuring, at the first station, a fading rate of the signal; and adjusting the loop gain as a function of the fading rate and a fading rate threshold.

In one embodiment, the method includes the steps of measuring, at a first station, a signal-to-noise ratio of a signal transmitted by a second station; adjusting a transmitted signal power of the signal as a function of a loop gain, the signal-to-noise ratio, and a signal-to-noise ratio threshold; measuring, at the first station, a signal quality of the received signal; adjusting the signal-to-noise ratio threshold as a function of the signal quality and a signal quality threshold; measuring, at the second station, a fading rate of a further signal transmitted by the first station; and adjusting the loop gain as a function of the fading rate and a fading rate threshold.

One advantage of the present invention is that it mitigates the effects of fast fading.

BRIEF DESCRIPTION OF THE FIGURES

The features, objects, and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

The present invention is an apparatus and method for double loop power control in a wireless communications system. In a preferred embodiment, the present invention operates within a code-division multiple-access (CDMA) communications system. Power control loops operating within such systems are disclosed in U.S. patent application Ser. No. 09/164,383, entitled "System and Method for Selecting Power Control Modes" and Ser. No. 09/164,384, entitled "System and Method for Optimized Power Control", filed herewith which are assigned to the assignee of the present invention, and incorporated by reference herein. Other examples of techniques for power control in such communication systems are found in U.S. Pat. No. 5,383,219, entitled "Fast Forward Link Power Control In A Code Division Multiple Access System," issued Jan. 17, 1995; U.S. Pat. No. 5,396,516, entitled "Method And System For The Dynamic Modification Of Control Parameters In A Transmitter Power Control System," issued Mar. 7, 1995; and U.S. Pat. No. 5,267,262, entitled "Transmitter Power Control System," issued Nov. 30, 1993, which are incorporated herein by reference.

I. Example Environment

Before describing the invention in great detail, it is useful to describe an example environment in which the invention can be implemented. The present invention can be implemented in any wireless communication system, especially one in which it is desirable to control the amount of power provided by a transmitter. Such environments include, without limitation, cellular communication systems, personal communication systems, satellite communication systems, and many others.

Figure 1:
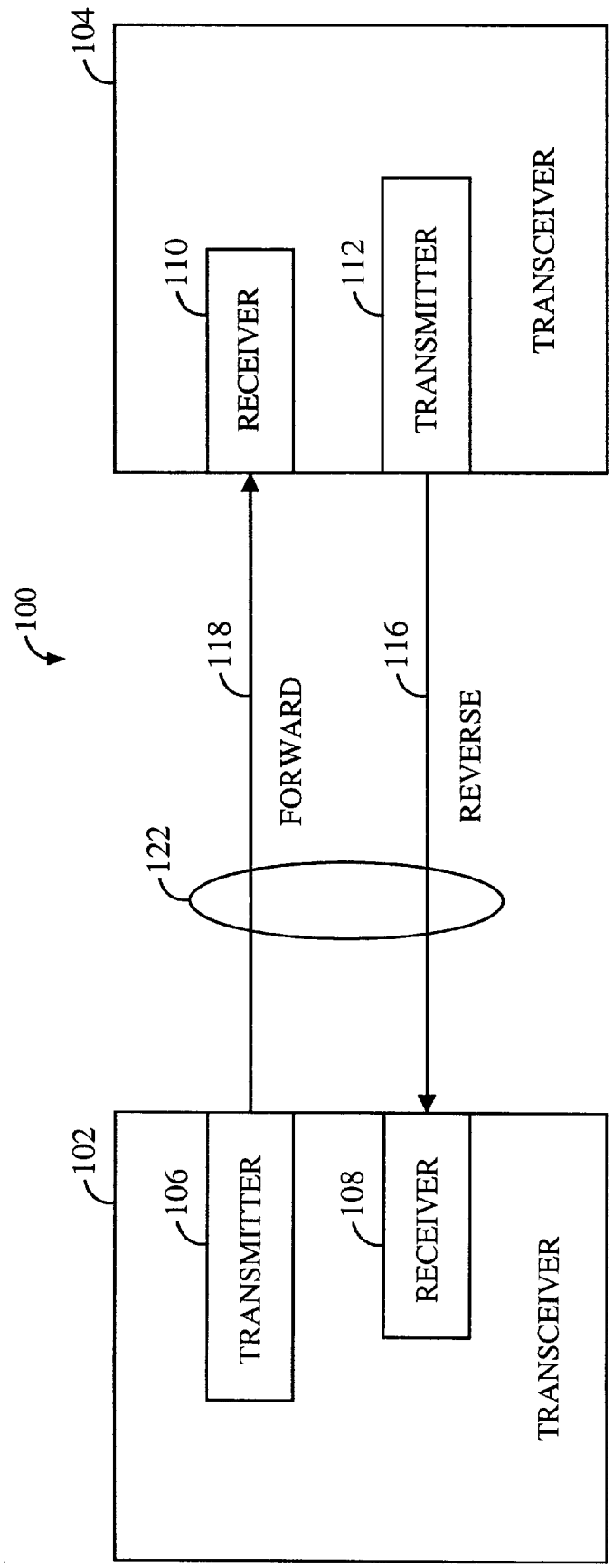
FIG. 1 is a block diagram illustrating an exemplary communication system.

FIG. 1 is a diagram illustrating an exemplary communication system 100. Referring to FIG. 1, system 100 has two transceivers 102 and 104. Transceiver 102 has a transmitter 106 and a receiver 108. Transceiver 104 has a transmitter 112 and a receiver 110.

Data or other information is transmitted between the transceivers over a transmission channel 122. In satellite, cellular and other wireless communication systems, channel 122 is a wireless link. In satellite communication systems, channel 122 includes one or more relay satellites. Channel 122 is a two-way channel that includes a "forward" signal 116 and a "reverse" signal 118.

In some environments, channel 122 is a packetized data path in which the data is transmitted in data packets. This is often the case where the information is in the form of digital data. In other environments, analog data is modulated onto a carrier and transmitted across channel 122.

In the example of a cellular communication system, transceiver 102 is a hand-held or mobile cellular telephone and transceiver 104 is a base station at the local cell site that is providing service in the phone's current area. In the example of a satellite communication system, transceiver 102 is a hand-held, mobile, or fixed transceiver (for example, a satellite telephone) and transceiver 104 is located in a terrestrial gateway. In the satellite communication system example, a satellite is used to relay signals between the transceivers 102 and 104 over channel 122.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

II. Power Control

The present invention is a system and method for adjusting transmitted signal power to compensate for fast fading in a wireless communications system. In fast fading, several signal fades occur during a single outer-loop period. Thus the outer loop is ineffective to mitigate fast fading. Such fast fading is often superimposed upon a slower fading trend. The inventors have found that one good solution to the fast fading case is to ignore the fast (high-frequency) component of the fading and instead track any slower (low-frequency) components of the fading. According to the present invention, when fast fading is detected, the system attempts to track the underlying slow fading rather than attempting to track the fast fading. In a preferred embodiment of the present invention, this is accomplished by using a small inner loop gain.

Figure 2:
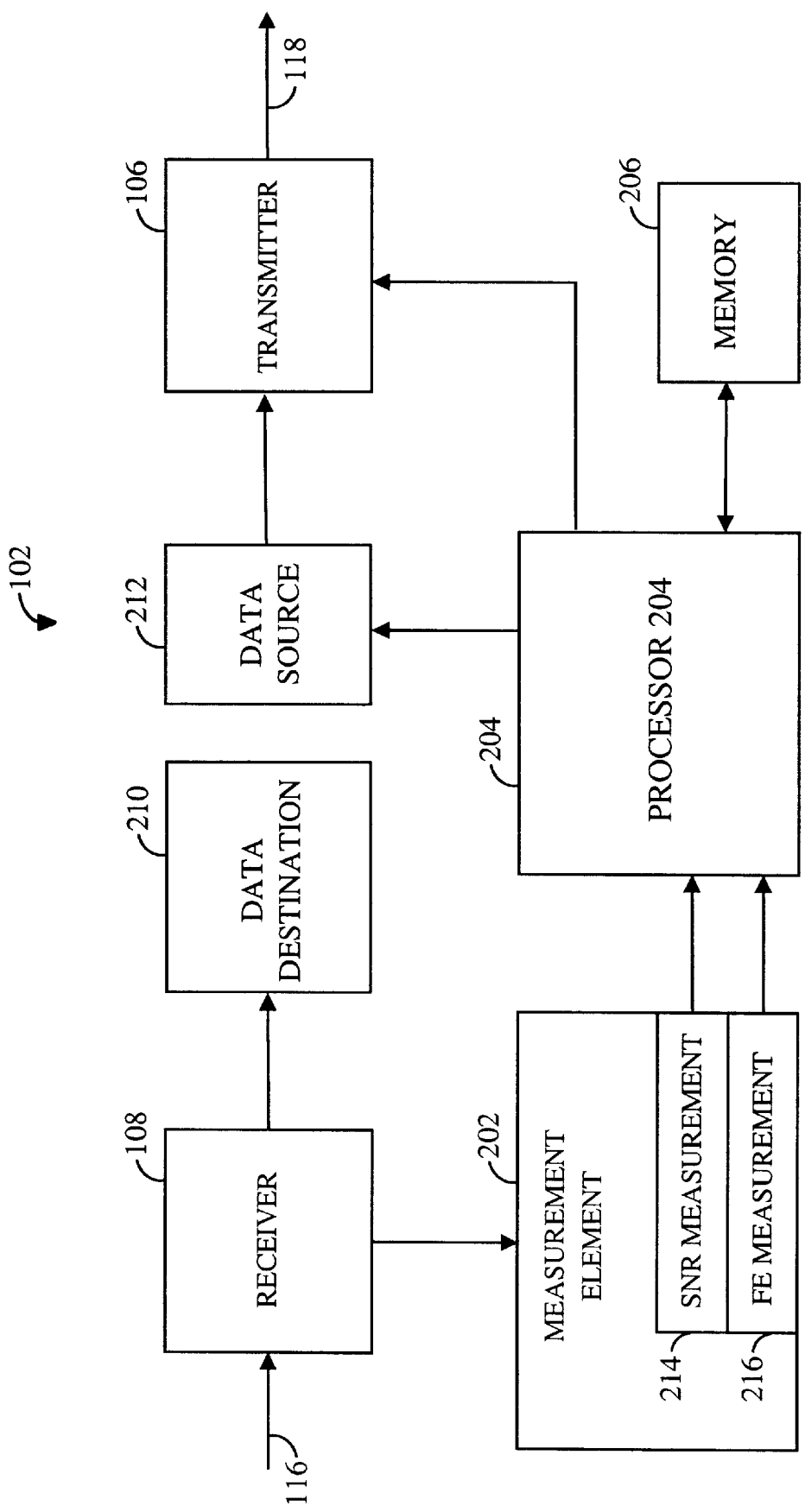
FIGS. 2 and 3 are block diagrams illustrating the transceivers of FIG. 1 in greater detail.

FIG. 2 is a block diagram illustrating transceiver 102 in greater detail. Transceiver 102 includes transmitter 106, receiver 108, a measurement element 202, a processor 204, a memory 206, a data destination 210 and a data source 212. In operation, receiver 108 receives signal 116 and passes it to data destination 210. Data destination 210 can be any element that makes use of the data, such as a CODEC, MODEM, digital signal processor, and the like. Receiver 108 may perform certain tasks, such as demodulation, on signal 116, as is well-known in the art.

Measurement element 202 makes certain measurements of the characteristics of signal 116, as is described in detail below. For example, these measurements include measurements of SNR, signal quality based on the presence of one or more error events (such as FER) and fading rate (FR). In a preferred embodiment, measurement element 202 includes a SNR measurement circuit 214 and a frame error measurement circuit 216. SNR measurement circuit 214 obtains measurements of the SNR of received signal 116. Frame error measurement circuit 216 obtains measurements of the error rate, or one or more other error events, of received signal 116. Circuits that accomplish these functions are well-known in the relevant arts. These measurements are passed to a processor 204, which can be any processor known in the art or developed hereafter. Processor 204 employs a memory 206 for storage of data, such as the SNR, FER, and FR measurements, and other values, such as thresholds for comparison with these measurements.

Data source 212 generates data for transmission. Data source 212 can include elements such as CODECs, MODEMs, digital signal processors, and the like, as is well-known in the art. Transmitter 106 receives data from data source 212 and performs such tasks as modulation. Processor 204 may be implemented using hardware, software or a combination thereof and may be implemented as a computer system or other processing system. In one embodiment, processor 204 is implemented as one or more computer systems. In another embodiment, processor 204 is implemented primarily in hardware using, for example, hardware components such as application specific integrated circuits (ASICs). Implementation of a hardware state machine so as to perform the functions described herein will be apparent to persons skilled in the relevant art(s). In yet another embodiment, processor 204 is implemented using a combination of both hardware and software.

Figure 3:
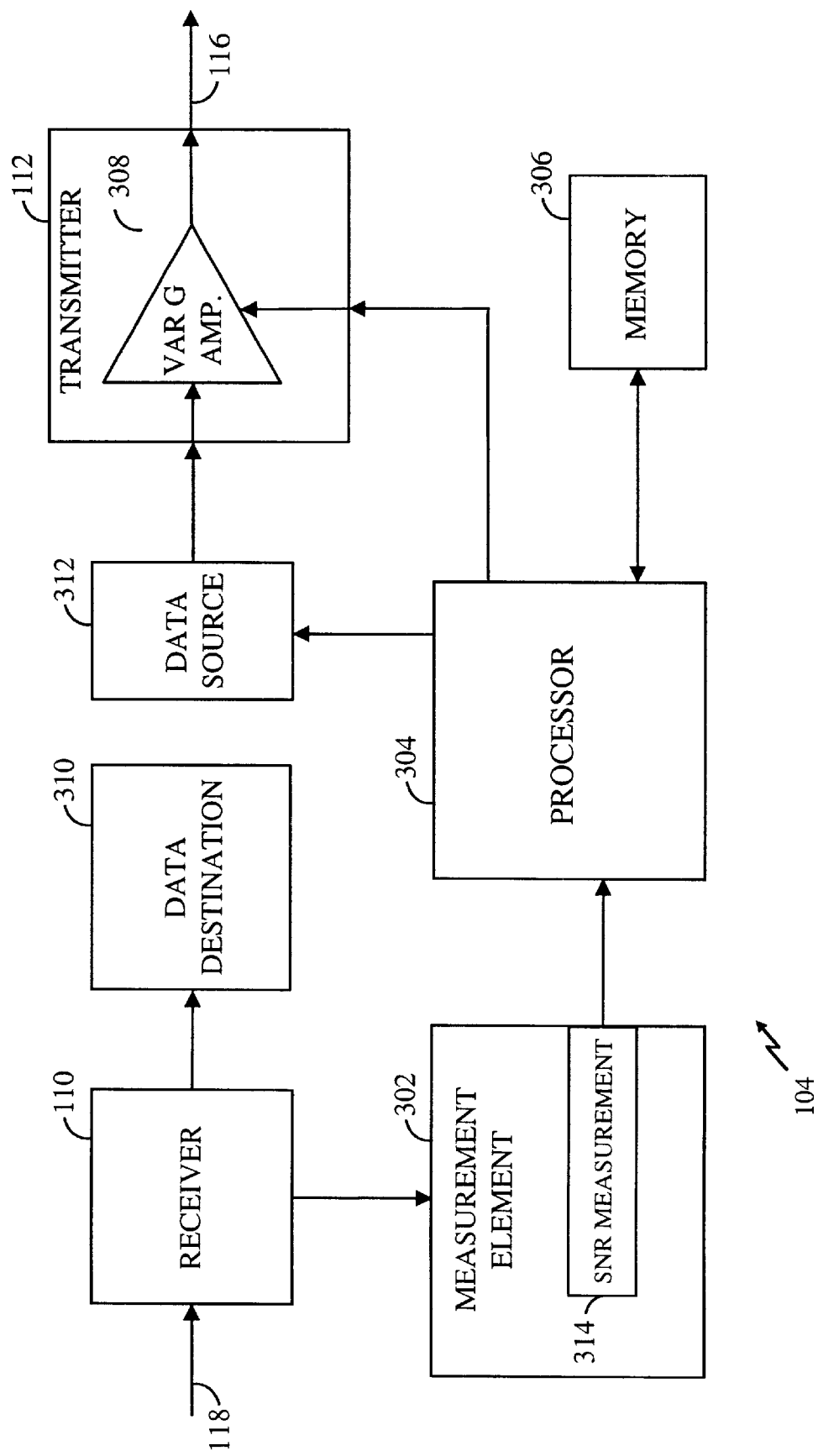

FIG. 3 is a block diagram illustrating transceiver 104 in greater detail. Transceiver 104 includes transmitter 112, receiver 110, a measurement element 302, a processor 304, a memory 306, a data destination 310 and a data source 312. In operation, receiver 110 receives signal 118 and passes it to data destination 310. Data destination 310 can be any element that makes use of the data, such as a CODEC, MODEM, digital signal processor, and the like. Receiver 110 may perform certain tasks, such as demodulation, on signal 118, as is well-known in the art.

Measurement element 302 makes certain measurements of the characteristics of signal 118, as is described in detail below. For example, these measurements include measurement of fading rate (FR). In a preferred embodiment, measurement element 302 includes a SNR measurement circuit 314. SNR measurement circuit 314 obtains measurements of the SNR of received signal 118. Circuits that accomplish this function are well-known in the relevant arts. These measurements are passed to transmitter 112 and/or data source 312 for transmission as part of signal 116. These measurements are passed to processor 304, which can be any processor known in the art or developed hereafter. Processor 304 employs a memory 306 for storage of data, such as the measurements, and other values, such as thresholds for comparison with these measurements.

Data source 312 generates data for transmission. Data source 312 can include elements such as CODECs, MODEMs, digital signal processors, and the like, as is well-known in the art. Transmitter 112 receives data from data source 312 and performs such tasks as modulation before transmitting signal 116. Transmitter 112 also includes a variable-gain amplifier 308 for amplifying the power of the signal prior to transmission to produce signal 116. The gain of amplifier 308 is controlled by processor 304.

Figure 4:
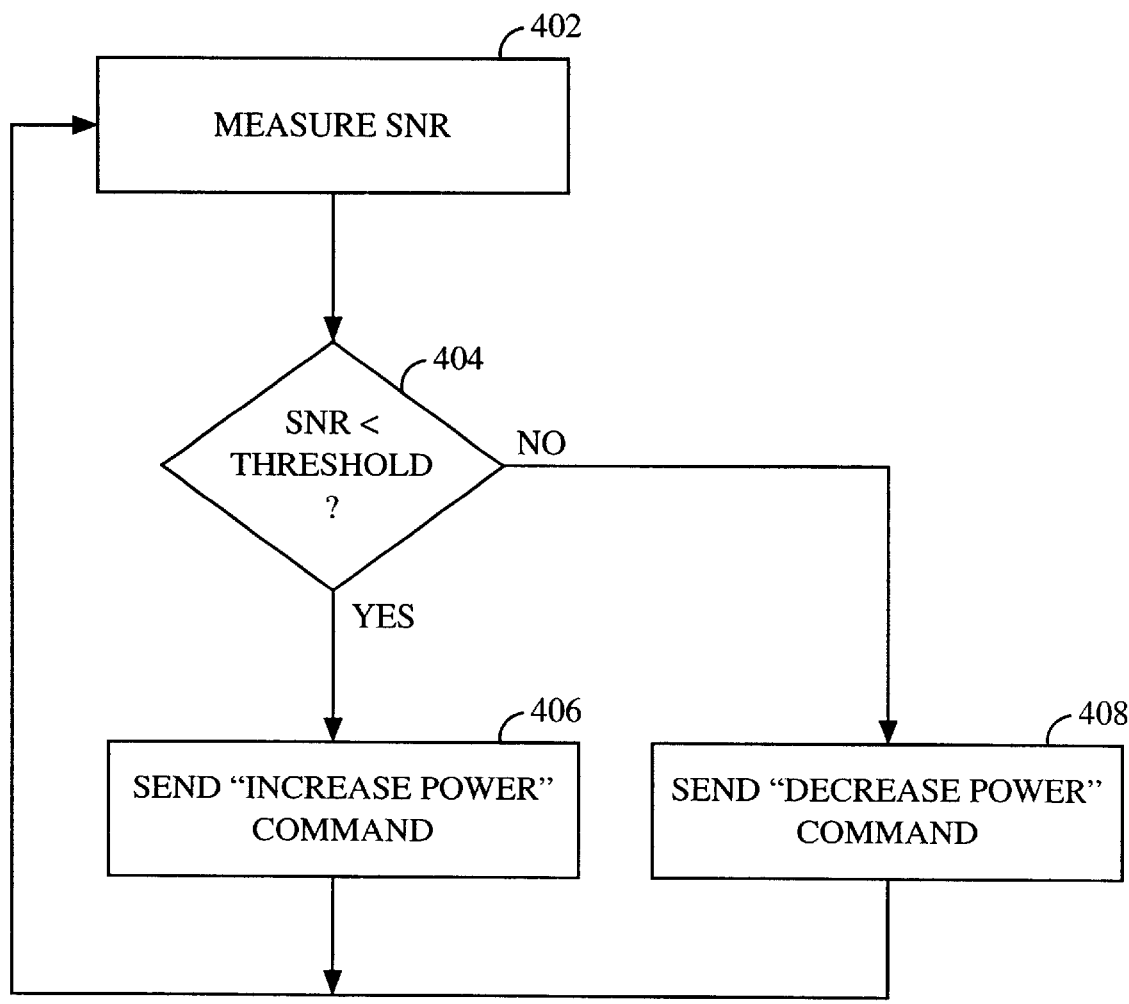
FIG. 4 is a flowchart depicting the operation of an inner power control loop according to a preferred embodiment of the present invention.
Figure 5:
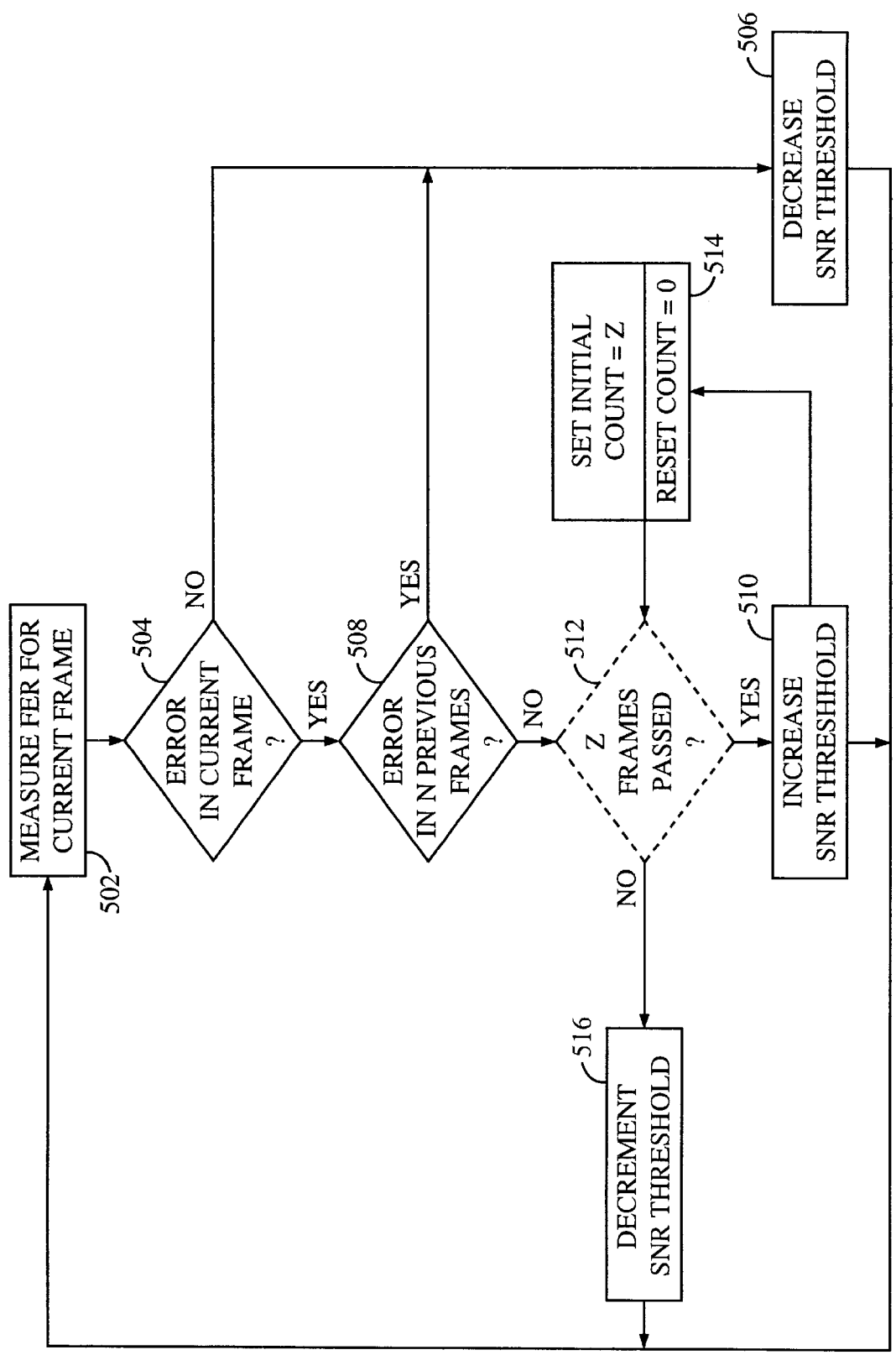
FIG. 5 is a flowchart depicting the operation of an outer power control loop according to a preferred embodiment of the present invention.
Figure 6:
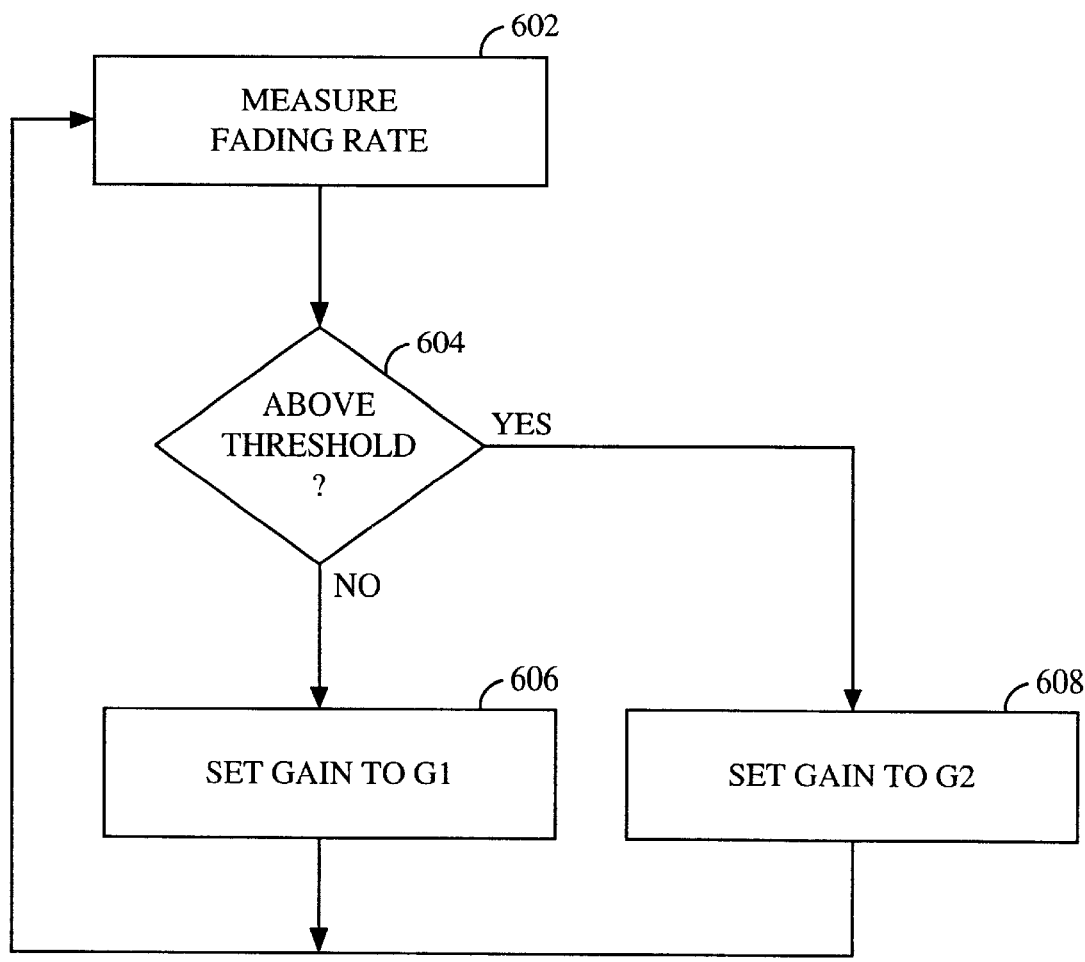
FIG. 6 is a flowchart depicting the operation of a variable-gain inner double-loop power control loop according to a preferred embodiment of the present invention.

FIGS. 4–6 are flowcharts depicting the operation of the present invention according to a preferred embodiment. FIG. 4 depicts the operation of the inner power control loop of the present invention. The function of the inner power control loop is to adjust the signal power transmitted by transmitter 112. In a preferred embodiment, the transmitted signal power is adjusted according to the level of signal power received at receiver 108, as described below.

Transmitter 112 transmits signal 116 over channel 122. Signal 116 is received by receiver 108. The process begins with the measurement by measurement element 202 of the power of signal 116, as shown in step 402. In a preferred embodiment, measurement element 202 measures the signal-to-noise ratio (SNR) of signal 116. More specifically, the present invention measures the quantity Eb/No, where Eb is energy per bit and No is noise density in units of power/cycle. Of course, other measures of signal power can be used without departing from the scope of the present invention. In a preferred embodiment, SNR is measured for every frame of received data.

In communication system 100, a predetermined SNR level, referred to as the "SNR threshold," is associated with receiver 108. The SNR threshold represents the minimum SNR at which signals should be received by receiver 108 in order to ensure data quality. The SNR threshold can be selected according to methods that are well-known in the relevant arts. One such method is to select a SNR that will keep data errors under a certain percentage, such as one percent. In step 404, receiver 108 compares the SNR measured in step 402 to the SNR threshold.

If the measured SNR is lower than the SNR threshold, then transmitter 106 of transceiver 102 transmits an "increase power" command to transceiver 104, as shown in step 406. In a preferred embodiment, the command is transmitted as part of signal 118 over channel 122. In response, transmitter 112 increases the signal power of the signal 116 by a predetermined amount, referred to as the "gain" of the inner loop, or "inner loop gain." In a preferred embodiment, the value of the inner loop gain, and the value of the signal gain applied by amplifier 308, are stored in memory 306. The value of the signal gain is manipulated by processor 304.

If the measured SNR exceeds the SNR threshold, then transmitter 106 of transceiver 102 transmits a "decrease power" command to transceiver 104, as shown in step 408. In response, transmitter 112 decreases the signal power of signal 116 by the inner loop gain. In either case, the process resumes at step 402.

FIG. 5 depicts the operation of the outer power control loop of the present invention (also referred to as the "outer loop"). The function of the outer power control loop is to adjust the SNR threshold of receiver 108. In a preferred embodiment, the SNR threshold is adjusted according to the quality of the received signal. In a preferred embodiment, the quality of the signal is considered not only for the current frame, but also for a certain number of previous frames. Also, in a preferred embodiment, the measure of signal quality used is the presence of one or more error events, for example using a frame error rate (FER). However, other measures of signal quality, such as parity checks, can be used without departing from the scope of the present invention. In addition, other methods of evaluating the signal quality history, such as averages and weighted averages, can be used.

A type of error often encountered is of the "burst" type. Burst errors are characterized by short duration. In general, the duration of a burst error is less than the inner loop period. Therefore, the inner loop cannot compensate for these errors. For this reason, it is desirable to isolate the inner loop from the effects of burst errors. Burst errors are also characterized by errors in multiple consecutive frames. The outer loop uses this characteristic to detect burst errors. When the outer loop detects errors in multiple consecutive frames, it determines that a burst error has occurred. When a burst error is detected, the outer loop does not change the SNR threshold of the inner loop. The outer loop changes the SNR threshold of the inner loop only in response to non-burst type errors, thereby isolating the inner loop from burst errors.

Referring to FIG. 5, the process begins by making measurements of a quantity indicative of the presence of errors, for example FER, as shown in step 502. The process determines whether or not errors are present in the current frame using the results of such measurements, as shown in step 504. If no errors are present in the current frame, as indicated by the "N" branch in step 504, then transceiver 102 decreases the SNR threshold by a predetermined amount, as shown in step 506. However, if errors are present in the current frame, as indicated by the "Y" branch in step 504, then the quality history of the received signal is reviewed, as shown in step 508. In a preferred embodiment, the error history comprises a predetermined number of previous frames N. Of course, the error history can be selected in other ways without departing from the scope of the present invention. The error history is preserved in memory 206. If any of the previous N frames contain an error, then transceiver 102 decreases the SNR threshold by the outer loop gain, as shown in step 506, subject to a desired frame or timing delay as discussed below.

However, if the previous N frames contain no errors, then transceiver 102 increases the SNR threshold, as shown in step 506. In a preferred embodiment, two change values are employed: one for decreasing the SNR threshold, and the other for increasing the SNR threshold. The change value for decreasing the SNR threshold is small, so that the SNR threshold, and through the action of the inner loop, the transmitted signal power, is gradually reduced in error-free environments. Conversely, the change value for increasing the SNR threshold is large, so that the SNR threshold, and through the action of the inner loop, the transmitted signal power, is quickly increased in error-prone environments.

In addition, it has been found that it is generally not desirable to quickly change the SNR threshold for a certain number of frames after an increase has been made regardless of the presence or not of errors, at least in some systems. Therefore, in one embodiment, an initial increase in the SNR occurs when encountering a frame error after a certain number of error free frames as just described, but for a preselected number of frames Z after this adjustment no additional increase is allowed to occur. That is, the detection or not of frame errors does not provide a mechanism for selecting further increases in the threshold value until Z frames or frame periods have occurred after an increase. This is shown by optional step 512 which is positioned between quality history checking step 508 and threshold adjustment step 510. In step 512, a check is made to see whether or not Z data frames have been processed since the last SNR threshold increase. The frame count for this processing step is initially set equal to Z so that the first time an adjustment is requested it is made, as shown by set/reset step 514. Subsequent adjustments will then be determined from the frame count.

Whenever Z frames have not yet been processed or passed through, the SNR threshold is allowed to decrease by a fairly small amount, or at a low rate, for each of the Z frames, as shown in step 516. That is, during or at the end of each frame period the SNR threshold level is decremented or decreased by a small percentage or amount, say on the order of 0.004 dB. Those skilled in the art will readily recognize that other amounts may be used including 0 dB, as desired. Processing then returns to step 512 where measurements continue and so forth. Once the requisite number of preselected frames Z have been reached, the SNR threshold is again increased in step 510 (or decreased in step 506) instead of decremented in step 516. Once an SNR threshold increase occurs, the frame count used in step 512 is reset to zero and the counting process beings anew until Z frames have again passed.

This gradual decrease process or period allows the system to "settle" before further action is taken and assures a more predictable and reproducible response to signal conditions. In addition, due to the bursty nature of some errors and the minimum amount of delay in implementing the power increase commands encountered in some systems (satellite) or situations, making short term requests for power won't help, or have a desired impact. However, waiting a few frames does help decrease the amount of power used.

After the preselected number of Z frames has passed, adjustment of the SNR threshold occurs as before. Detection of errors again causes an increase in the SNR threshold, provided the previous N frames contain no errors. In a preferred embodiment, Z is selected to be six frames after the frame generating or triggering an increase in SNR threshold, during which no additional increase occurs and a gradual decrease is implemented. However, those skilled in the art will understand that other values can be chosen according to known response characteristics of the communication system in which the invention is employed.

FIG. 6 is a flowchart depicting the operation of a variable-gain inner double-loop power control loop according to a preferred embodiment of the present invention. In step 602, receiver 108 measures a fading rate of a signal received from transceiver 104A. According to a preferred embodiment, receiver 108 measures the SNR of the received signal several times over the course of each frame to produce a series of measurements. This series is applied to a high-pass filter to detect rapid changes in SNR, which indicate the presence of fast fading. The output of the high-pass filter, referred to as the "fading rate" is compared to a predetermined fading rate threshold, as shown in step 604.

When the fading rate does not exceed the threshold, as indicated by the "N" branch from step 604, the fading is not sufficiently rapid to be characterized as fast. In that case, the inner-loop gain is set to a first predetermined gain level G1, as shown in step 606.

When the high-frequency content of the fading exceeds the threshold, as indicated by the "Y" branch in step 604, the fading is sufficiently rapid to be characterized as fast. In that case, the inner-loop gain is set to a second predetermined gain level G2, as shown in step 608. In either case, processing resumes at step 602.

In a preferred embodiment, first gain level G1 is much larger than second gain level G2. In other words, the inner-loop gain applied during fast fading is much less than the inner-loop gain applied otherwise. The result is that, during fast fading, the power control loop does not attempt to track the rapid signal power level fluctuations caused by the fast fading, but rather tracks the slower power level fluctuations caused by slower fading. In one embodiment, G1 is approximately 0.5 dB, and G2 is approximately 0.1 dB.

In one embodiment, the user terminal detects fast fading in the signal transmitted from the gateway to the user terminal. In this embodiment, the user terminal reports the fast fading condition to the gateway, which responds by adjusting the inner-loop gain of the power control loop. Referring to FIG. 1, fast fading in signal 116 is detected by transceiver 102 in step 604. Transceiver 102 detects fast fading in signal 116 by evaluating fluctuations in its SNR, as described in detail above. Fast fading is detected by evaluating the SNR. Transmitter 106 then transmits a command to receiver 110 to adjust the inner-loop gain. In accordance with that command, transceiver 104 adjusts the inner-loop gain in steps 606 and 608.

In another embodiment, the gateway infers that fast fading exists in the signal transmitted from the gateway to the, user terminal by detecting fast fading of a signal transmitted by the user terminal to the gateway. Referring to FIG. 1, the fading rate of signal 116 is inferred by transceiver 104 by evaluating the SNR fluctuations in signal 118 in steps 602 and 604, as described in detail above. Transceiver 104 then adjusts the inner-loop gain in steps 606 and 608 based on that evaluation.

III. CONCLUSION

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus comprising:
   means coupled to a first station for measuring a signal-to-noise ratio of a signal transmitted by a second station, said signal comprising a plurality of frames;
   means for adjusting a transmitted signal power of said signal as a function of a loop gain, said signal-to-noise ratio, and a signal-to-noise ratio threshold;
   means coupled to said first station for measuring a signal quality of the received signal;
   means for adjusting said signal-to-noise ratio threshold as a function of said signal quality and a signal quality threshold, comprising:
      means for increasing said signal-to-noise ratio threshold when a current frame has an error and a predetermined number of previous frames have no errors with a preselected minimum period between increases; and
      means for decreasing said signal-to-noise ratio threshold otherwise;
   means coupled to said first station for measuring a fading rate of said signal; and
   means for adjusting said loop gain as a function of said fading rate and a fading rate threshold.

2. The apparatus of claim 1, wherein said signal-to-noise ratio threshold is decreased by a preselected small amount over said minimum period.

3. The apparatus of claim 1, wherein:
   said means for increasing comprises means for increasing said signal-to-noise ratio threshold by a predetermined amount; and
   said means for decreasing comprises means for decreasing said signal-to-noise ratio threshold by much less than said predetermined amount.

4. An apparatus comprising:
   means coupled to a first station for measuring a signal-to-noise ratio of a signal transmitted by a second station;
   means for adjusting a transmitted signal power of said signal as a function of a loop gain, said signal-to-noise ratio, and a signal-to-noise ratio threshold;
   means coupled to said first station for measuring a signal quality of the received signal;
   means for adjusting said signal-to-noise ratio threshold as a function of said signal quality and a signal quality threshold;
   means coupled to said first station for measuring a fading rate of said signal; and
   means for adjusting said loop gain as a function of said fading rate and a fading rate threshold comprising:
      means for setting said loop gain to a first loop gain when said fading rate is below said fading rate threshold; and
      means for setting said loop gain to a second loop gain when said fading rate is above said fading rate threshold.

5. The apparatus of claim 4, wherein said second loop gain is much smaller than said first loop gain.

6. An apparatus comprising:
   means coupled to a first station for measuring a signal-to-noise ratio of a signal transmitted by a second station, said signal comprising a plurality of frames;
   means for adjusting a transmitted signal power of said signal as a function of a loop gain, said signal-to-noise ratio, and a signal-to-noise ratio threshold;
   means coupled to said first station for measuring a signal quality of the received signal;
   means for adjusting said signal-to-noise ratio threshold as a function of said signal quality and a signal quality threshold, comprising:
      means for increasing said signal-to-noise ratio threshold when a current frame has an error and a predetermined number of previous frames have no errors with a preselected minimum period between increases; and
      means for decreasing said signal-to-noise ratio threshold otherwise;
   means coupled to said second station for measuring a fading rate of a further signal transmitted by said first station; and
   means for adjusting said loop gain as a function of said fading rate and a fading rate threshold.

7. The apparatus of claim 6, wherein said signal-to-noise ratio threshold is decreased by a preselected small amount over said minimum period.

8. The apparatus of claim 6, wherein:
   said means for increasing comprises means for increasing said signal-to-noise ratio threshold by a predetermined amount; and
   said means for decreasing comprises means for decreasing said signal-to-noise ratio threshold by much less than said predetermined amount.

9. An apparatus comprising:
   means coupled to a first station for measuring a signal-to-noise ratio of a signal transmitted by a second station;
   means for adjusting a transmitted signal power of said signal as a function of a loop gain, said signal-to-noise ratio, and a signal-to-noise ratio threshold;
   means coupled to said first station for measuring a signal quality of the received signal;
   means for adjusting said signal-to-noise ratio threshold as a function of said signal quality and a signal quality threshold;
   means coupled to said second station for measuring a fading rate of a further signal transmitted by said first station; and
   means for adjusting said loop gain as a function of said fading rate and a fading rate threshold, comprising:
      means for setting said loop gain to a first loop gain when said fading rate is below said fading rate threshold; and
      means for setting said loop gain to a second loop gain when said fading rate is above said fading rate threshold.

10. The apparatus of claim 9, wherein said second loop gain is much smaller than said first loop gain.

11. A method comprising the steps of:

measuring, at a first station, a signal-to-noise ratio of a signal transmitted by a second station, said signal comprising a plurality of frames;

adjusting a transmitted signal power of said signal as a function of a loop gain, said signal-to-noise ratio, and a signal-to-noise ratio threshold;

measuring, at said first station, a signal quality of the received signal;

adjusting said signal-to-noise ratio threshold as a function of said signal quality and a signal quality threshold, comprising the steps of:
increasing said signal-to-noise ratio threshold when a current frame has an error and a predetermined number of previous frames have no errors with a preselected minimum period between increases; and
decreasing said signal-to-noise ratio threshold otherwise;

measuring, at said first station, a fading rate of said signal; and adjusting said loop gain as a function of said fading rate and a fading rate threshold.

12. The method of claim 11, wherein said signal-to-noise ratio threshold is decreased by a preselected small amount over said minimum period.

13. The method of claim 11, wherein:

said increasing step comprises the step of increasing said signal-to-noise ratio threshold by a predetermined amount; and said decreasing step comprises the step of decreasing said signal-to-noise ratio threshold by much less than said predetermined amount.

14. A method comprising the steps of:

measuring, at a first station, a signal-to-noise ratio of a signal transmitted by a second station;

adjusting a transmitted signal power of said signal as a function of a loop gain, said signal-to-noise ratio, and a signal-to-noise ratio threshold;

measuring, at said first station, a signal quality of the received signal;

adjusting said signal-to-noise ratio threshold as a function of said signal quality and a signal quality threshold;

measuring, at said first station, a fading rate of said signal; and adjusting said loop gain as a function of said fading rate and a fading rate threshold, comprising the steps of:
setting said loop gain to a first loop gain when said fading rate is below said fading rate threshold; and
setting said loop gain to a second loop gain when said fading rate is above said fading rate threshold.

15. The method of claim 14, wherein said second loop gain is much smaller than said first loop gain.

16. A method comprising the steps of:

measuring, at a first station, a signal-to-noise ratio of a signal transmitted by a second station, said signal comprising a plurality of frames;

adjusting a transmitted signal power of said signal as a function of a loop gain, said signal-to-noise ratio, and a signal-to-noise ratio threshold;

measuring, at said first station, a signal quality of the received signal;

adjusting said signal-to-noise ratio threshold as a function of said signal quality and a signal quality threshold, comprising the steps of:
increasing said signal-to-noise ratio threshold when a current frame has an error and a predetermined number of previous frames have no errors with a preselected minimum period between increases; and
decreasing said signal-to-noise ratio threshold otherwise;

measuring, at said second station, a fading rate of a further signal transmitted by said first station; and adjusting said loop gain as a function of said fading rate and a fading rate threshold.

17. The method of claim 16, wherein said signal-to-noise ratio threshold is decreased by a preselected small amount over said minimum period.

18. The method of claim 16, wherein said increasing step comprises the step of increasing said signal-to-noise ratio threshold by a predetermined amount; and said decreasing step comprises the step of decreasing said signal-to-noise ratio threshold by much less than said predetermined amount.

19. A method comprising the steps of:

measuring, at a first station, a signal-to-noise ratio of a signal transmitted by a second station;

adjusting a transmitted signal power of said signal as a function of a loop gain, said signal-to-noise ratio, and a signal-to-noise ratio threshold;

measuring, at said first station, a signal quality of the received signal;

adjusting said signal-to-noise ratio threshold as a function of said signal quality and a signal quality threshold;

measuring, at said second station, a fading rate of a further signal transmitted by said first station; and adjusting said loop gain as a function of said fading rate and a fading rate threshold comprising the steps of:
setting said loop gain to a first loop gain when said fading rate is below said fading rate threshold; and
setting said loop gain to a second loop gain when said fading rate is above said fading rate threshold.

20. The method of claim 19, wherein said second loop gain is much smaller than said first loop gain.

* * * * *